Patented May 3, 1932

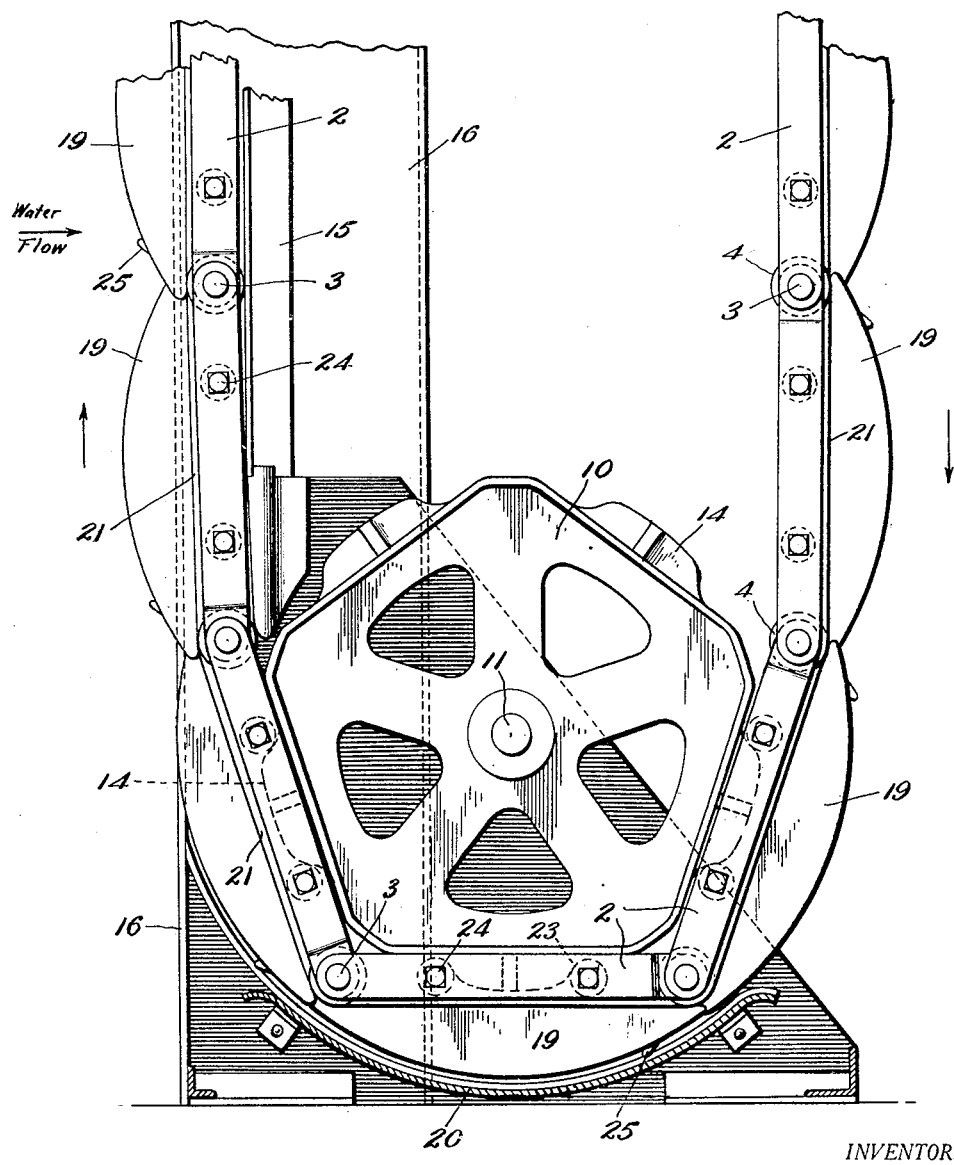

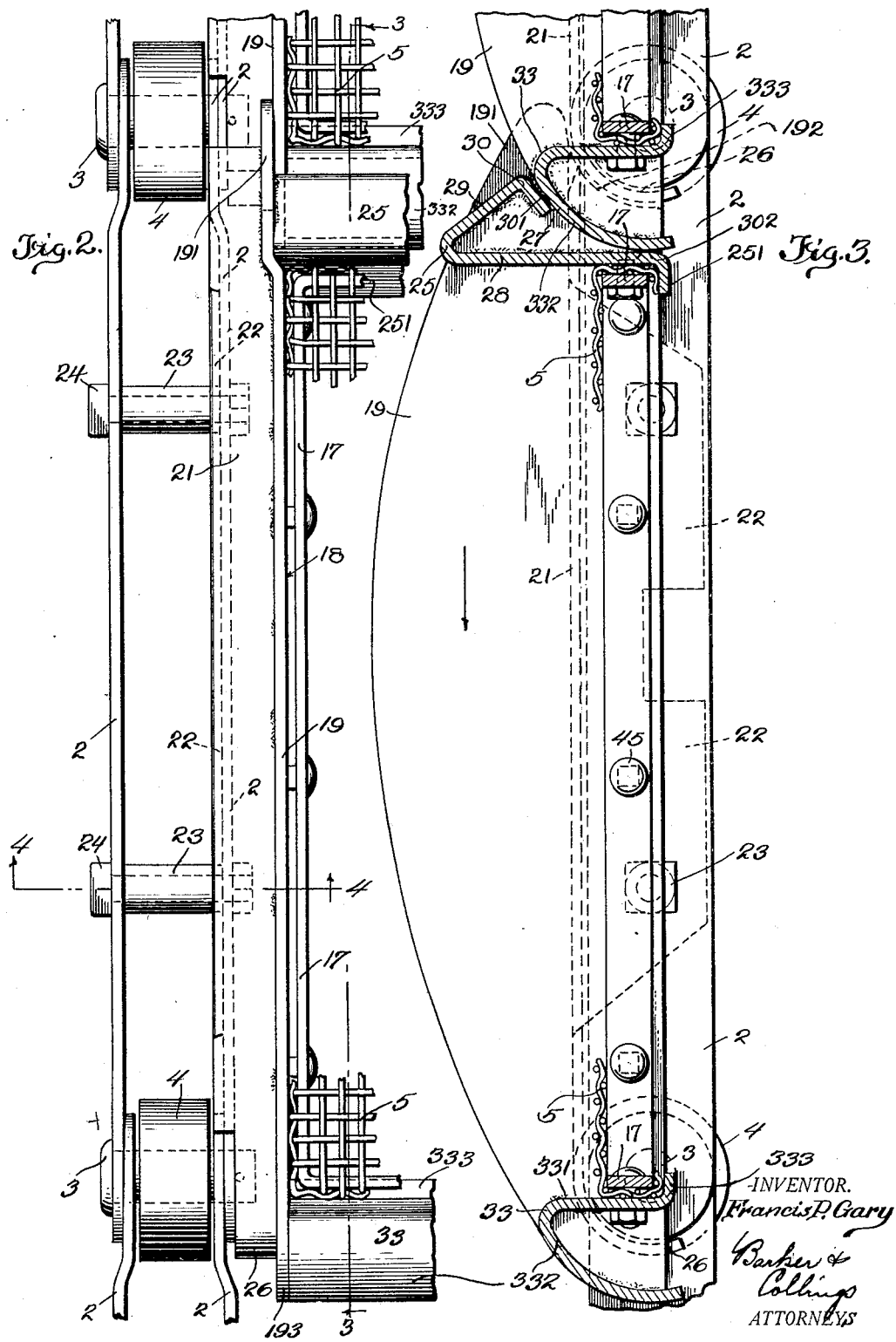

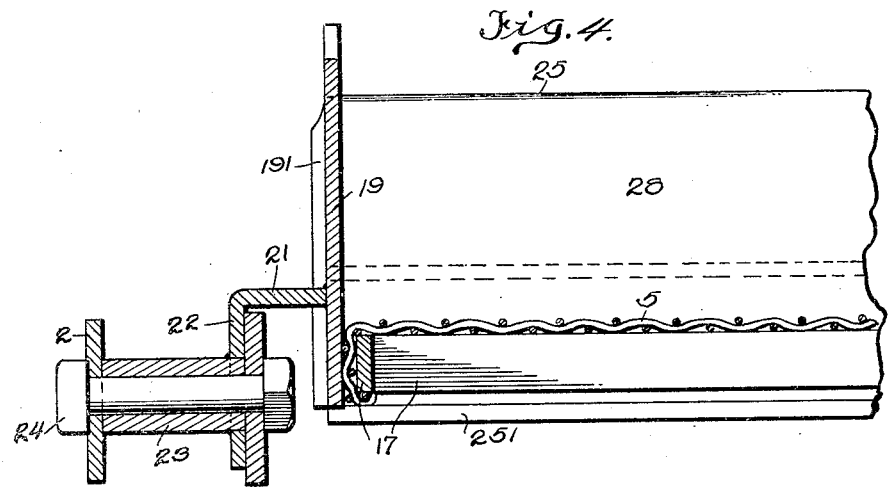
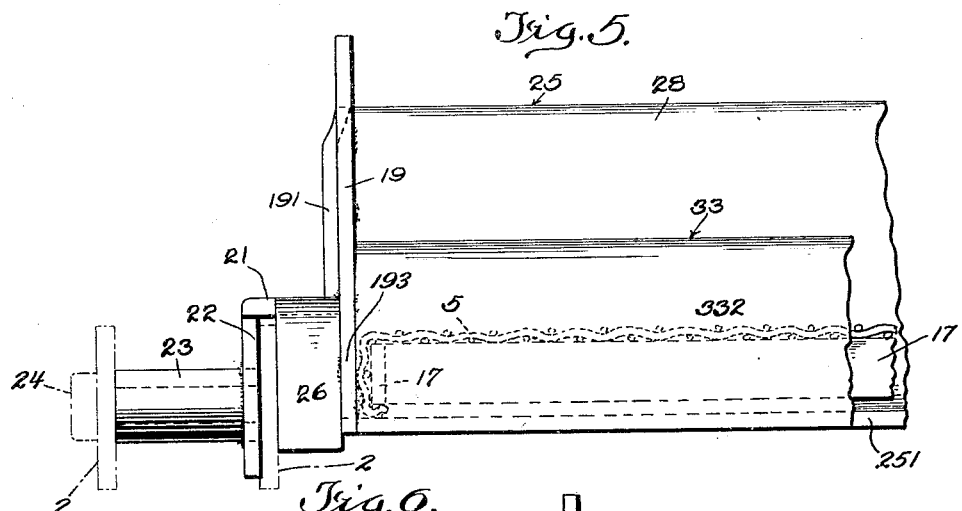
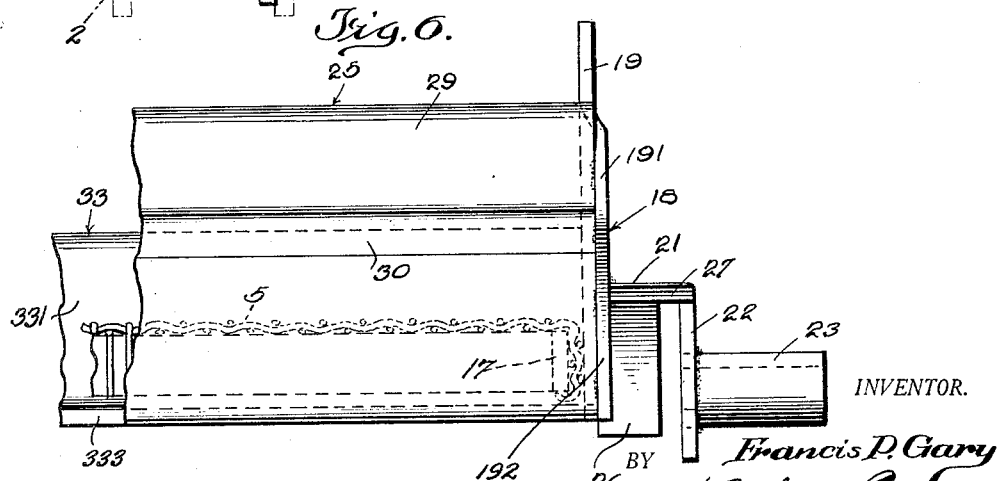

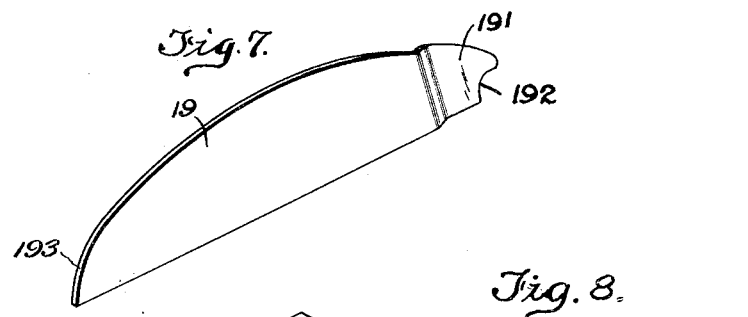
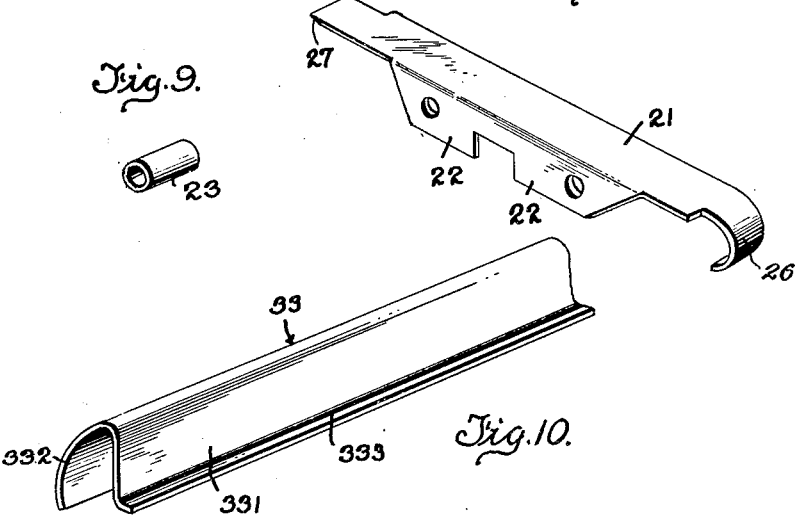
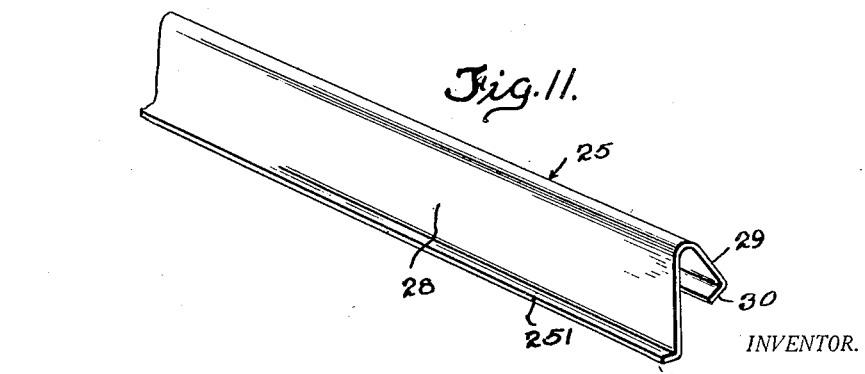

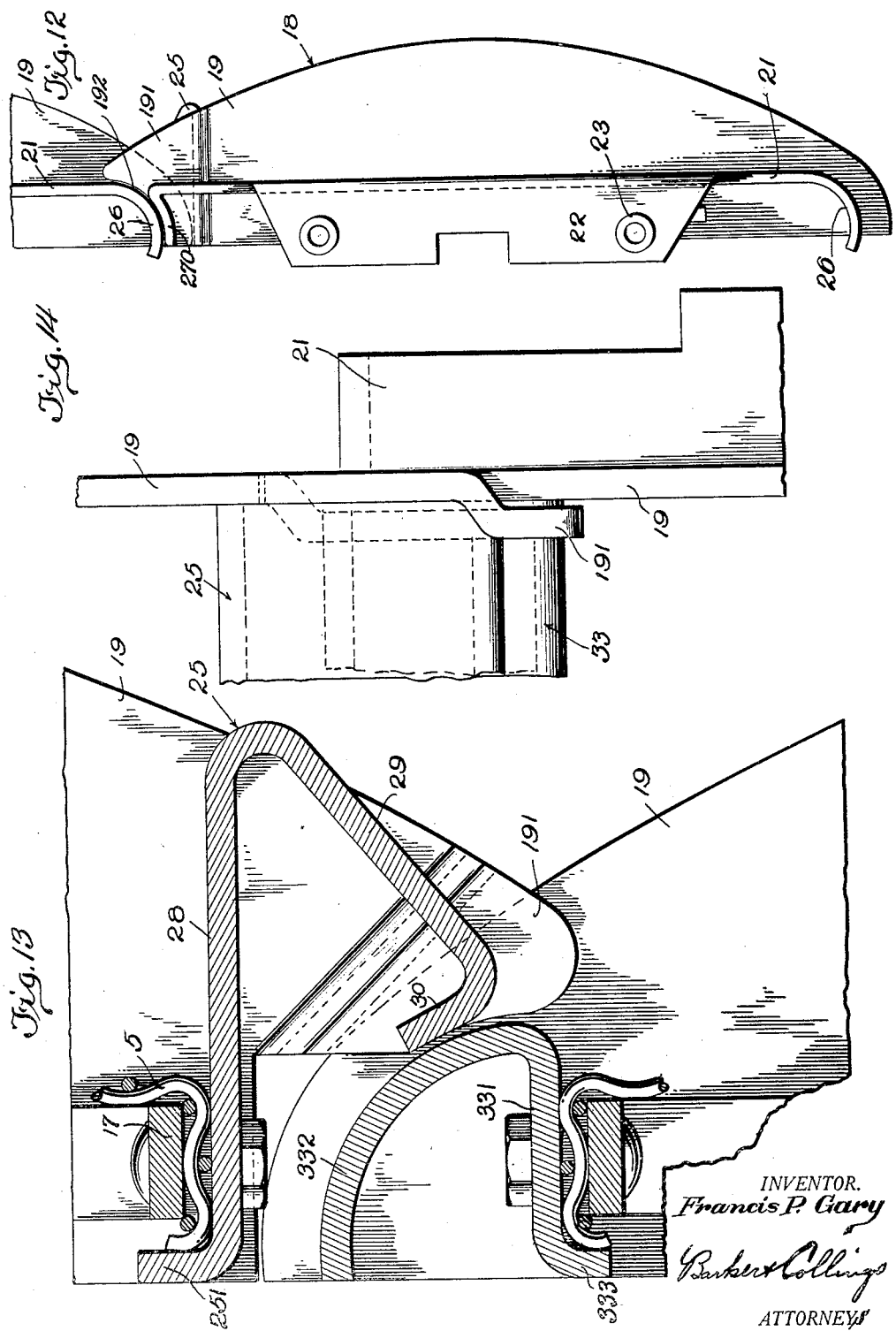

1,856,381

UNITED STATES PATENT OFFICE

FRANCIS P. GARY, OF MILWAUKEE, WISCONSIN, ASSIGNOR TO CHAIN BELT COMPANY, OF MILWAUKEE, WISCONSIN, A CORPORATION OF WISCONSIN

ENDLESS TRAVELING WATER SCREEN

Application filed December 17, 1929. Serial No. 414,696.

This invention relates to endless traveling water screens and has for one of its objects to improve the construction of the baskets and frames therefor, whereby the cost of manufacture may be reduced, while at the same time the screens will be more efficient in use than those which have been heretofore proposed.

A further object of the invention is to provide a basket construction for water screens wherein the seals for preventing the passage of unscreened water around the various moving parts of the apparatus are improved and rendered more efficient.

A still further object of the invention is to provide a basket frame made up of a number of sheet metal members or elements which may be quickly and cheaply stamped to the desired forms and assembled into units by welding or other suitable means.

A still further object of the invention is to provide an improved method of securing the screening material or surface in place in the basket frame whereby the normal tendency of trash carried by the water to pull the screening material out of the frame will be effectively overcome.

With the above and other objects in view which will appear as the description proceeds, the invention consists in the novel details of construction and combinations and arrangements of parts more fully hereinafter disclosed and particularly pointed out in the appended claims.

This application is a continuation in part of my co-pending application filed November 12, 1928, Serial No. 318,964, entitled Endless sectional water screen and patented November 11, 1930, No. 1,781,223.

Referring to the accompanying drawings forming a part of the present specification in which like reference characters designate like parts in all the views:—

Figure 1 is a side elevational view, partly broken away, of the lower or boot portion of an endless sectional water screen of a well known form;

Figure 2 is an enlarged elevational view of a portion of the screen shown in Figure 1, as viewed from the right of the said figure;

Figure 3 is an enlarged vertical sectional elevational view, taken approximately on the plane indicated by the line 3—3 of Figure 2, looking in the direction of the arrows;

Figure 4 is a transverse sectional view taken approximately on the plane indicated by the line 4—4 of Figure 2;

Figure 5 is a fragmentary end elevational view of a portion of one of the screen baskets as viewed from the bottom of Figure 2, and looking in the same direction as Figure 4;

Figure 6 is a similar view looking at the opposite edge of a basket, toward the trash lip;

Figures 7, 8, 9, 10 and 11 are detail perspective views of the sheet metal members which enter into the construction of one of the basket frames;

Figure 12 is a side elevational view of a slightly modified form of the side member for the basket frame;

Figure 13 is an enlarged fragmentary sectional view of a further modified form of side member; and Figure 14 is a fragmentary elevational view of the parts shown in Figure 13, as viewed from the right of the said figure.

Referring more particularly to Figs. 1 to 11 of the drawings the numeral 1 indicates generally the sprocket chains which carry and support the baskets constituting the endless traveling water screen as is well known in the art, the said chains comprising side bars 2 which are pivotally connected by the chain pins 3 upon which are mounted the rollers 4, as will be clear from Figures 1, 2 and 3. The said chains 1 pass around and engage with the lower sprocket wheels 10 carried by the transverse shaft 11 suitably mounted within the stationary screen frame. The said wheels 10 are provided with teeth 14 which enter between the side bars 2 of the links and serve to guide the chains within the boot as will be readily understood by those skilled in the art.

The screen baskets, the construction of which constitutes the gist of the present invention, comprise a pair of fabricated side members indicated by the numeral 18 and a pair of spaced transverse members 25 and 33. The said fabricated side members are formed of a plurality of stamped sheet metal elements suitably joined together subsequent to stamping by welding or in any other suitable manner. The said members 18 include a side plate 19 one edge of which is substantially straight while the other edge is convexly curved upon an arc conforming substantially to the curvature of the boot portion 20 of the screen frame. As is well known in the art these members serve not only as side plates for the screen baskets, but also co-act with the said boot 20 to provide trash seals which prevent the passage of unscreened water around the parts as they travel through the boot. Such members are well known in the art and in their broadest aspect, constitute no part of the invention.

Secured to one side face of plate 19 is a sheet metal member 21 which provides a laterally extending flange adapted to form one element of a side trash seal, the other element of which is formed by a stationary portion 16 of the screen frame as is likewise well known in the art. The said member 21 is preferably stamped to provide an angularly disposed extension 22 to which is secured in any suitable manner as by welding, a pair of hollow studs 23 through which bolts 24 may be passed to secure the screen baskets to the chain links 2, as will be clear from Figures 2, 3 and 4. At one end the laterally projecting flange member 21 is curved as indicated at 26, see Figs. 2, 3 and 8, to provide an arcuate extension which, when the parts are assembled, is substantially concentric with the axis of articulation of the screen sections. This said arcuate portion is adapted to lie in close proximity to and to co-act with a complementary beveled end 27 of the next adjacent flange member 21 to provide an articulating side trash seal adjacent the chain pins 3, all as is disclosed in my said co-pending application No. 318,964.

It has been previously proposed to provide articulating trash seals of the edge to edge type at the meeting ends of the plates 19, and one form of such seal is shown in my said prior application. In the present instance, however, in order to obviate certain objections which have arisen in connection with this type of seal in actual practice, it is preferred to make the plates 19 of such length that they will overlap one another, as clearly indicated in Figs. 2 and 3, and to offset one end of each plate as indicated at 191 to permit such overlapping. This construction enables me to obtain a face to face seal of relatively large surface area between adjacent plates which is more effective to prevent the passage of trash and small fish at this point than the edge to edge seal heretofore used. The advantages of the latter seal may be retained in the present construction by cutting away a portion of the extended offset portion 191 upon an arc which conforms to the outer surface of the curved portion 26 of the lateral flange 21, whereby the curved edge 192 may co-act with the said curved portion 26 to provide an additional edge seal which, it will be noted, is at substantially right angles to the face seal thereby providing a tortuous passage through which water must find its way and which, of course, is much more efficient in preventing the passage of trash than is any straight passage.

As above stated each basket frame includes in addition to the side members 18 just described, a pair of spaced transverse members 25 and 33. As in my previous application above mentioned, these members are formed of stamped sheet metal with the member 25 being reversely bent upon itself to provide a rearwardly extending portion 29 which terminates in an angularly disposed portion 30, see Fig. 3. The main body portion 28 of the elements 25 projects forwardly a considerable distance from the screen surface 5 and constitutes a trash lifting lip which serves to raise larger pieces of solid material which do not adhere to the screening surface when the screen is moved for cleaning purposes. The rear edge of the member 25 is preferably turned at substantially right angles to the body portion 28 to provide a lip 251 as clearly shown in Figs. 2 and 3.

The other transverse member 33 of each basket frame is likewise stamped from sheet metal to provide a substantially straight forward projecting portion 331 and a reversely extending portion 332, the latter portion being curved upon an arc concentric with the center of the chain pin 3. The curved edge 192 of the plate 19 is made flush with the outer surface of the curved portion 332 and the parts are so proportioned as to lie in close proximity to the angular extension 30 of the member 25 as indicated at 301 in Fig. 3, and also at a point indicated by the numeral 302 adjacent the base of the member 25. There is thus provided a double transverse seal at the articulating point of the screen baskets which effectively prevents the passage of trash at these points. The base of the member 33 is preferably provided with an angularly extending lip 333 as shown in Figs. 2 and 3, which corresponds with the lip 251 of members 25.

The screening surfaces may be of any suitable construction but are preferably composed of wire mesh or perforated sheet material. It has heretofore been the practice in mounting the screening members in baskets of this type to bend the edges of the screen elements at substantially right angles to the surface and to clamp these angularly disposed edges against the inner surface of the basket frame by means of suitable clamping bars such as 17, in the present drawings. The previous practice has been, however, to place these clamping bars in front of the screening surface, as considered with relation to the direction of the flow of the unscreened water, and as a result actual practice has shown that where large pieces of trash are present in the water there is a marked tendency for the screens to pull out of position between the clamping bars and the basket frames with a result that they frequently have to be replaced. Furthermore, in these previous constructions the heads of the bolts 45 or the nuts thereon, depending upon which were placed inwardly, formed obstructions around which trash collects in such a manner that it has been found impossible in actual practice to dislodge it by means of the water sprays usually employed for cleaning the screen surfaces.

In order to overcome these difficulties I prefer to place the clamping bars 17 behind the screen surface when considered in relation to the direction of flow of unscreened water, as shown in Figure 3. The strain imposed upon the screen surface when so rounded by large pieces of trash which tend to dislodge the said surface, is not a strain pulling straight against the clamping bolts 45 but is translated into a strain at right angles thereto with the result that screens mounted in this manner, seldom, if ever, pull out of position under the action of large pieces of trash. The angular lips 251 and 333 of the transverse members 25 and 33 further assist in clamping the screen member in position and retaining it there, as will be readily understood from Figure 3.

The modified form of the invention shown in Figure 12 relates to the construction of the side members 18 and is quite similar to the preferred form shown in Figures 1 to 11 inclusive. The difference resides in the fact that in this modified form, both ends of the lateral flange 21 are bent to form arcs of a circle which is concentric with the axis of articulation, instead of only one end as in the previously described construction. That is to say, in addition to the convexly curved end 26 of the flange member 21 the other end is concavely bent as indicated at 270 so that its concave surface will co-act with the convex surface of the end 26 of the next adjacent basket member to provide an articulating face to face seal of much larger area than that shown in Figures 1 to 11. Otherwise the constructions are identical.

In Figures 13 and 14 there is disclosed a still further modified form of the invention in which the overlapping ends of the side plates 19 are offset in a direction opposite to that disclosed in the preceding forms. That is to say, in this form the offset ends 191 are bent inwardly of the screen baskets, as distinguished from the outwardly offset ends disclosed in the preferred form. However, the face to face seal between the overlapping ends of the plates 19 is maintained, as will be readily understood from Figures 13 and 14.

It is obvious that those skilled in the art may vary the details of construction as well as the precise arrangement of parts, without departing from the spirit of the invention and, therefore, it is not wished to be limited to the above disclosure except as may be required by the claims.

What is claimed is:

1. In a basket for endless traveling water screens, a frame including a transversely extending member, and a forwardly extending plate one end of which overlies the center of articulation between adjacent baskets, the other end of said plate being offset outwardly to overlap the complementary end of the plate of the next adjacent basket to provide a face to face trash seal adjacent the center of articulation, said offset end also coacting with said transversely extending member to provide an additional edge seal adjacent said center.

2. In a basket for endless traveling water screens, a frame having side members, each of which includes a laterally extending flange having a curved portion which is concentric with the center of articulation of the basket, and a forwardly extending plate one end of which overlies said center of articulation, the other end of said plate being offset outwardly to overlap the complementary end of the plate of the adjacent basket to provide a face to face trash seal concentric with the center of articulation, said offset end also coacting with the curved portion of said lateral flange to provide an additional edge seal adjacent the center of articulation, at substantially a right angle to said first seal.

3. In a basket for endless traveling water screens, a frame having side members, each of which includes a laterally extending flange one end of which is convexly curved concentric with the center of articulation of the basket, and a forwardly extending plate, one end of which overlies said center of articulation, the other end of said plate being offset outwardly to overlap the complementary end of the plate of the next adjacent basket to provide a face to face trash seal adjacent the center of articulation, said offset end being also cut away on an arc concentric with said center whereby it may coact with said convexly curved end of the lateral flange to provide an additional edge seal adjacent the center of articulation.

4. In a basket for endless traveling water screens, a frame having side members, each of which includes a laterally extending flange, one end of which is convexly curved concentric with the center of articulation of the basket, and the other end of which is concavely curved concentric with the center of articulation of the next adjacent basket, whereby it may coact with the convexly curved portion of the flange of said next adjacent basket to form a seal concentric with and parallel to the axis of articulation.

5. In a vertical endless sectional water screen, a screen section or basket comprising a rectangular frame, a screen surface carried thereby, a transverse attachment at the rear end of the basket consisting of a flat outwardly extending bar forming a trash lifting lip which is wholly perpendicular to the screen surface, said bar having a reverse extension continuing from the outer edge of the lip, the edge of the extension being arranged to cooperate with a cross piece of an adjacent basket to constitute a transverse articulating trash seal.

6. In an endless sectional water screen, a screen section or basket comprising a rectangular frame, a screen surface carried thereby, and an end attachment constituting a trash-lifting lip which is wholly perpendicular to the screen surface, consisting of an upright plate, a section extending rearwardly from the edge of the lip, and a flange at the edge of the said section arranged to cooperate with an edge piece of an adjacent basket to form a transverse articulating trash seal at the end of the basket.

7. In a vertical endless sectional water screen, a series of pivotally united screen baskets each formed of a rectangular frame, a screening surface supported thereby, a rear cross attachment consisting of an outwardly extending flat wall wholly perpendicular to the screen surface and a reversely bent wall extending rearwardly from the outer edge thereof, and a transverse attachment at the forward end of the basket, such latter attachment extending beyond the screening surface and being formed with a forward curved extension the surface of which is concentric with the pivot uniting adjacent baskets, and the edge of each rear extension of a rear cross attachment being brought close to the curved extension of the adjacent front transverse attachment whereby are formed transverse trash seals between the baskets.

8. In a traveling water screen, a pair of articulating screen baskets, each having a transverse member, one of said members projecting forward from the screen surface to constitute a trash lifting lip and being provided at its outer edge with a rearward extension; the other of said members coacting with said rearward extension and with the base portion of said lip member to provide a double articulating trash seal.

9. In a traveling water screen, a pair of articulating screen baskets each having a transverse member, one of said members projecting perpendicularly forward from the screen surface to constitute a trash lifting lip and being provided at its outer edge with a rearward extension; the other of said members having a curved portion concentric with the axis of articulation of the baskets, adapted to coact with said rearward extension and with the base of said lip member to provide a double transverse articulating trash seal.

10. In a traveling water screen, a pair of articulating screen baskets, each comprising a pair of spaced transverse members and side members secured to the ends thereof, one of said transverse members projecting perpendicularly forward from the screen surface to constitute a trash lifting lip, and being provided with a portion extending rearwardly from the forward edge of said lip; the other of said transverse members having a curved portion concentric with the axis of articulation of the baskets, adapted to coact with said rearwardly extending portion and with the base of said lip member to provide a double transverse articulating trash seal; said side members including forwardly extending plates, one of the ends of which is curved to substantially conform to the curvature of said second transverse member and is in alinement therewith.

In testimony whereof I affix my signature.

FRANCIS P. GARY.